US009487383B2

(12) United States Patent
Minard et al.

(10) Patent No.: US 9,487,383 B2
(45) **Date of Patent: *Nov. 8, 2016**

(54) ADAPTER PLATE IN A PUMP OF A BEVERAGE SYSTEM

(75) Inventors: James J. Minard, South Beloit, IL (US); Mark E. Bush, Rockton, IL (US)

(73) Assignee: Carrier Commercial Refrigeration, Inc., Charlotte, NC (US)

( * ) Notice: Subject to any disclaimer, the term of this patent is extended or adjusted under 35 U.S.C. 154(b) by 1631 days.

This patent is subject to a terminal disclaimer.

(21) Appl. No.: 12/094,313

(22) PCT Filed: Dec. 12, 2005

(86) PCT No.: PCT/US2005/045127

§ 371 (c)(1), (2), (4) Date: May 20, 2008

(87) PCT Pub. No.: WO2007/070035

PCT Pub. Date: Jun. 21, 2007

(65) Prior Publication Data

US 2008/0317611 A1 Dec. 25, 2008

(51) Int. Cl.
*F04B 39/00* (2006.01)
*B67D 1/10* (2006.01)
*F04B 39/12* (2006.01)
(Continued)

(52) U.S. Cl.
CPC ................. *B67D 1/10* (2013.01); *B67D 1/105* (2013.01); *F04B 7/06* (2013.01); *F04B 13/02* (2013.01); *F04B 39/121* (2013.01); *F04B 39/123* (2013.01); *F04B 39/125* (2013.01)

(58) Field of Classification Search
CPC .... B67D 1/105; F04B 39/123; F04B 39/121; F04B 39/125; F04B 13/02; F04B 19/00
USPC ................. 417/360, 493, 500; 222/333, 319, 222/145.5–145.7
See application file for complete search history.

(56) References Cited

U.S. PATENT DOCUMENTS 1,615,765 A * 1/1927 Laws ............................ 222/319
4,099,919 A * 7/1978 Leidal ........................... 422/133
4,531,897 A * 7/1985 Orlita ............................ 417/500
(Continued)

OTHER PUBLICATIONS

International Preliminary Report on Patentability dated Jun. 26, 2008.
(Continued)

*Primary Examiner* — Charles Freay
*Assistant Examiner* — Christopher Bobish
(74) *Attorney, Agent, or Firm* — Carlson, Gaskey & Olds, P.C.

(57) ABSTRACT

A beverage system includes a pump that draws a set amount of a flavored concentrate into a mixing chamber for mixing with water to form a beverage. A pump head includes a piston opening that receives a piston and a water port that defines a water flow path. The pump head includes protrusions. An adapter plate includes a piston opening that receives the piston and a water opening that receives the water port of the pump head. The adapter plate includes depressions. When the adapter plate is installed in the pump, the piston opening of the adapter plate and the piston opening of the pump head align, and the water port of the pump head is received in the water opening of the adapter plate. The protrusions of the pump heads are received in the depressions of the adapter plate, aligning the pump head and the adapter plate.

24 Claims, 5 Drawing Sheets

(51) Int. Cl.
*F04B 13/02* (2006.01)
*F04B 7/06* (2006.01)

(56) References Cited

U.S. PATENT DOCUMENTS

| | | | | |
|---|---|---|---|---|
| 4,708,605 | A * | 11/1987 | Orlita | 417/500 |
| 5,219,455 | A * | 6/1993 | Trucco | 417/307 |
| 5,601,421 | A * | 2/1997 | Lee | 417/492 |
| 6,234,358 | B1 * | 5/2001 | Romine et al. | 222/181.3 |
| 6,336,405 | B1 * | 1/2002 | Kawata et al. | 101/480 |
| 6,347,928 | B1 * | 2/2002 | Renaud | 417/360 |
| 6,378,737 | B1 | 4/2002 | Cavallaro et al. | |
| 6,719,542 | B2 | 4/2004 | Shibuya | |
| 6,764,284 | B2 * | 7/2004 | Oehman, Jr. | 417/360 |
| 7,988,916 | B2 * | 8/2011 | Bremauer | 422/75 |
| 8,272,317 | B2 * | 9/2012 | Minard | A47J 31/402 99/275 |
| 2004/0182092 | A1 * | 9/2004 | Bush | A23G 3/0221 62/66 |

OTHER PUBLICATIONS

Search Report PCT/US05/45127.

* cited by examiner

ADAPTER PLATE IN A PUMP OF A BEVERAGE SYSTEM

BACKGROUND OF THE INVENTION

The present invention relates generally to a pump employed in a beverage system including an adapter plate with an alignment feature that engages a corresponding alignment feature on a pump head to maintain proper alignment between the adapter plate and the pump head.

Beverages systems are employed to make beverages. A flavored concentrate and water are mixed to form the beverage. Typically, the flavored concentrate is stored in a concentrate container. A piston of a pump nutates within a pump head to draw a set amount of the flavored concentrate into a mixing chamber. Water is mixed with the flavored concentrate in the mixing chamber to form the beverage with a desired concentration.

The beverage system includes a locking ring that secures an adapter plate to the pump head. The adapter plates aligns the piston and a housing of a motor. The adapter plate includes a piston opening and a water opening. A drawback to prior adapter plates is that if the adapter plates moves during use, the adapter plate can be misaligned with the pump head. Movement or loosening of the adapter plate can cause the beverage system to leak.

Hence, there is a need in the art for a pump employed in a beverage system including an adapter plate with an alignment feature that engages a corresponding alignment feature on a pump head to maintain proper alignment between the adapter plate and the pump head and that overcomes the drawbacks and shortcomings of the prior art.

SUMMARY OF THE INVENTION

A beverage system makes beverages, soft drinks, milkshakes, dairy products, other frozen desserts or any mixed product. A pump draws a set amount of a flavored concentrate into a mixing chamber. The flavored concentrate and water combine in the mixing chamber to form the beverage.

A piston of a pump nutates within a pump head to draw the set amount of the flavored concentrate into the mixing chamber. The pump includes an adapter plate that aligns the piston and a housing of a motor.

The pump head includes a piston opening that receives a portion of the piston and a water port that defines a water flow path. The pump head includes a protrusion that extends from the piston port and another protrusion that extends from the water opening.

The adapter plate includes a piston opening that receives a portion of the piston and a water opening that receives the water port of the pump head. The adapter plate includes a depression that extends from the piston opening and another depression that extends from the water opening.

When the adapter plate is installed in the pump, the piston opening of the adapter plate and the piston opening of the pump head align, and the water port of the pump head is received in the water opening of the adapter plate. The protrusions of the pump head are received in the depressions of the adapter plate, aligning the pump head and the adapter plate. A locking ring attaches the adapter plate to the pump head, creating a geometric lock between the pump head and the adapter plate.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
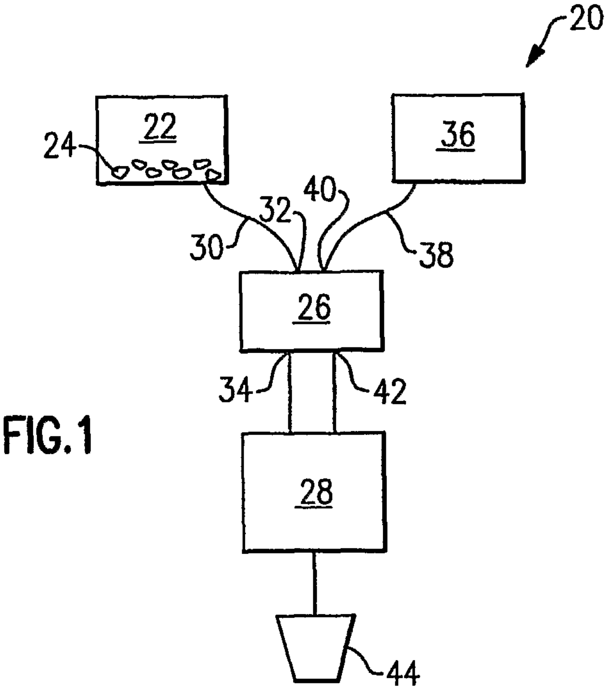
FIG. 1 schematically illustrates a beverage system used to make a beverage.

FIG. 1 schematically illustrates a beverage system 20 of the present invention. The beverage system 20 can be used to make beverages, soft drinks, milkshakes, dairy products, juices, other frozen desserts or any mixed product. The beverage system 20 includes a concentrate container 22 that contains a flavored concentrate 24 or syrup. In one example, the concentrate container 22 is a sealed bag that is cooled by a refrigeration system (not shown).

A pump 26 draws a set amount of the flavored concentrate 24 from the concentrate container 22 and into a mixing chamber 28. The flavored concentrate 24 from the concentrate container 22 flows along a conduit 30 and into a concentrate inlet 32 of the pump 26. The pump 26 controls the flow and the amount of the flavored concentrate 24 that is dispensed by the pump 26 through a concentrate outlet 34 and into the mixing chamber 28. Chilled water from a water source 36 cooled by a refrigeration system (not shown) flows along a conduit 38 and enters the pump 26 through a water port 40. In one example, the conduit 38 is made of copper. The pump 26 controls the flow of water through a water outlet 42 and into the mixing chamber 28. All the conduits 30 and 38 to the inlets 32 and 40, respectively, of the mixing chamber 28 are insulated.

The flavored concentrate 24 and the water are thoroughly mixed in the mixing chamber 28 to create the beverage having a desired concentration. The mixing chamber 28 is insulated to keep the mixed beverage cold. In one example, the concentration of water to flavored concentrate 24 is approximately 10:1 through 2:1. The beverage is then dispensed from the mixing chamber 28 into a cup 44 for serving.

Figure 3:
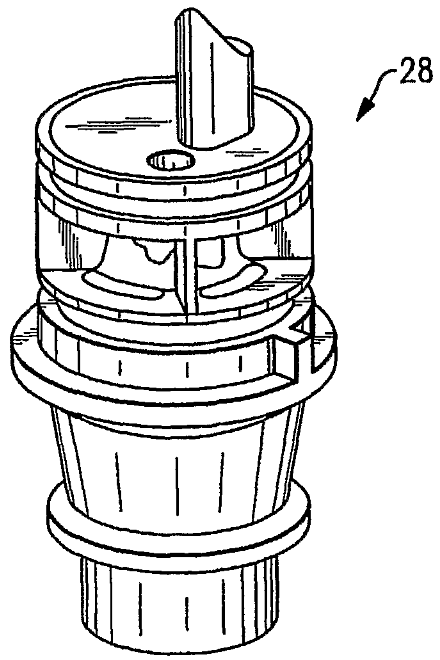
FIG. 3 schematically illustrates a perspective view of a mixing chamber of the pump.
Figure 2:
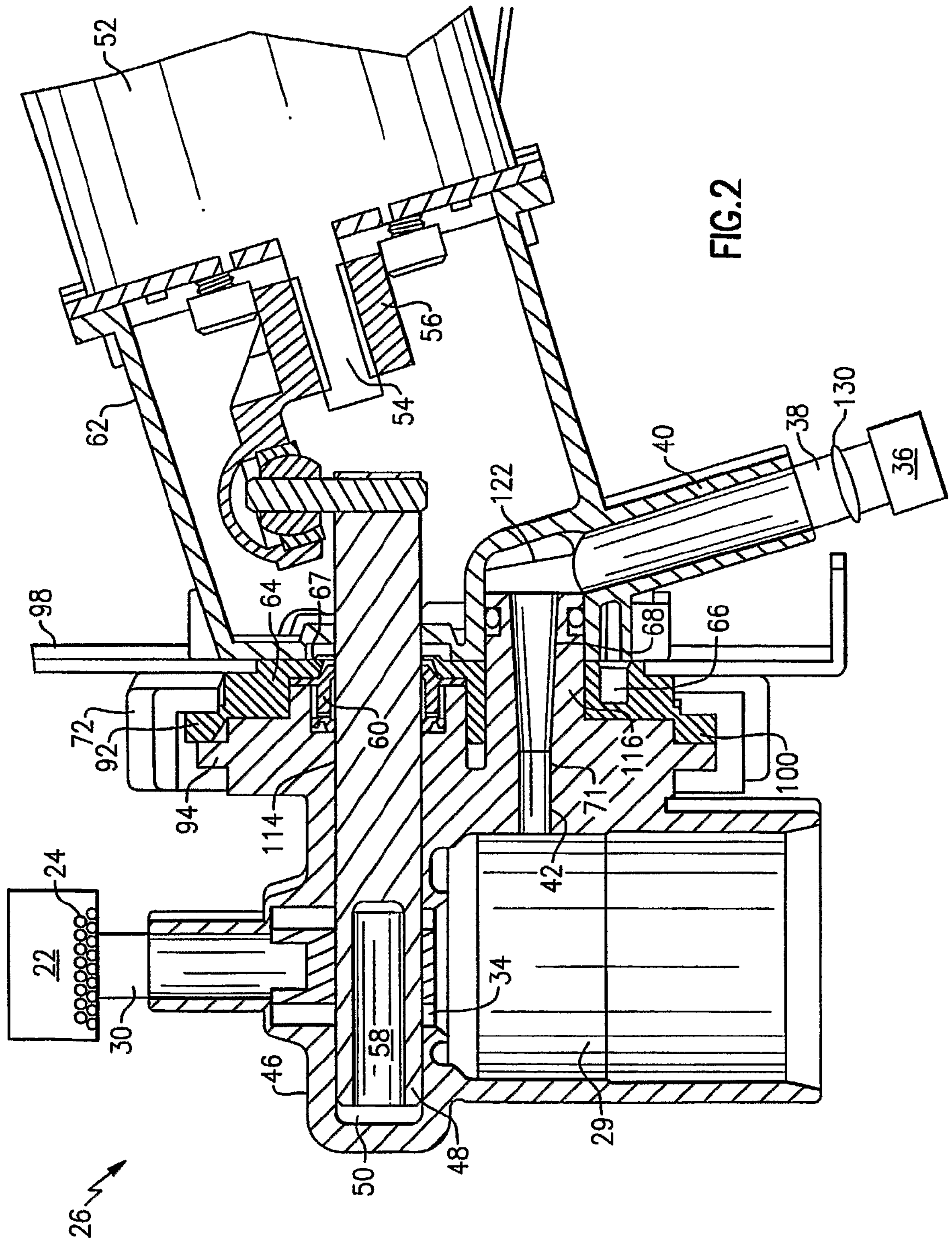
FIG. 2 schematically illustrates a cross-sectional view of a pump of the beverage system.

FIG. 2 schematically illustrates the pump 26 including a pump head 46. The flavored concentrate 24 in the concentrate container 22 flows along the conduit 30 and enters the pump head 46 through the concentrate inlet 32. A portion of a piston 48 received in a compartment 50 of the pump head 46 is substantially cylindrical in shape and includes an irregular surface 58. In one example, the irregular surface 58 can be a flattened surface or a substantially u-shaped depression. A cavity is defined between the irregular surface 58 of the piston 48 and the walls of the compartment 50. The compartment 50 has a fixed volume and does not expand or contract during operation of the pump 26. In one example, the piston 48 is made of stainless steel, and the compartment 50 is made of steel. The piston 48 controls the flow of the flavored concentrate 24 from the concentrate container 22 and into the mixing chamber 28 (shown in FIG. 3) that is housed in a mixing chamber housing 29. The pump 26 is described in U.S. patent application Ser. No. 10/955,175 filed Sep. 30, 2004 and entitled POSITIVE DISPLACEMENT PUMP, herein incorporated entirely by reference.

The pump 26 includes a motor 52 that drives a motor shaft 54. The motor 52 moves the piston 48 to draw the flavored concentrate 24 into the cavity through the concentrate inlet 32 and to release the flavored concentrate 24 from the cavity through the concentrate outlet 34. The concentrate outlet 34 functions as a top portion of the mixing chamber 28. The motor shaft 54 includes a hub assembly 56. The hub assembly 56 is a plastic molded part that holds brass components that allow for free rotation within the degrees of the pump 26 operation. As the motor shaft 54 rotates, the hub assembly 56 also rotates. Engagement of the hub assembly 56 with the piston 48 causes the piston 48 to both move linearly and to rotate. That is, the piston 48 nutates.

Figure 4:
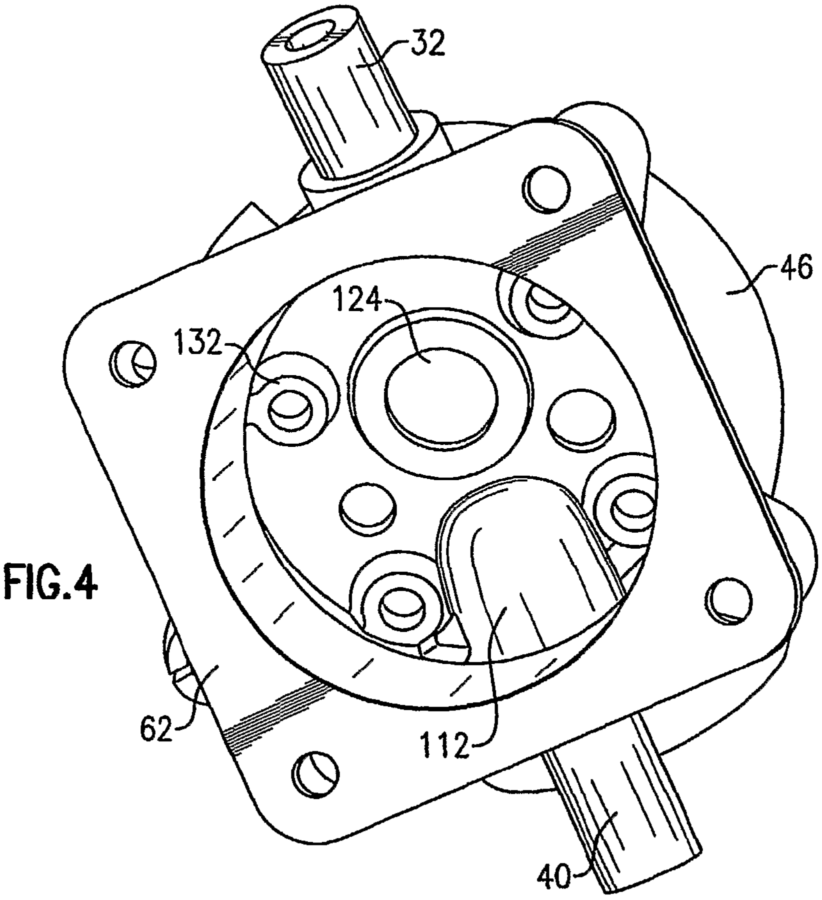
FIG. 4 schematically illustrates a front view of a housing and a pump head of a pump.

As shown in FIG. 4, a housing 62 aligns the motor 52 and the motor shaft 54 and mounts the motor 52 to an assembly panel 98. The housing 62 includes a water port 40 that provides a path for the water from the water source 36 to flow into a water chamber 112 in the housing 62, through a water port 116 of the pump head 46, along the water flow path 70 in the water port 116 and into the mixing chamber 28. The flow of water along the water flow path 70 is controlled by a valve 130. A portion of the water port 116 of the pump head 46 is received in the water chamber 112 of the housing 62. The housing 62 includes a piston opening 124 that receives a portion of the piston 48. The housing 62 also includes a plurality of protrusion or recesses 132 that surround the piston opening 124.

Figure 5:
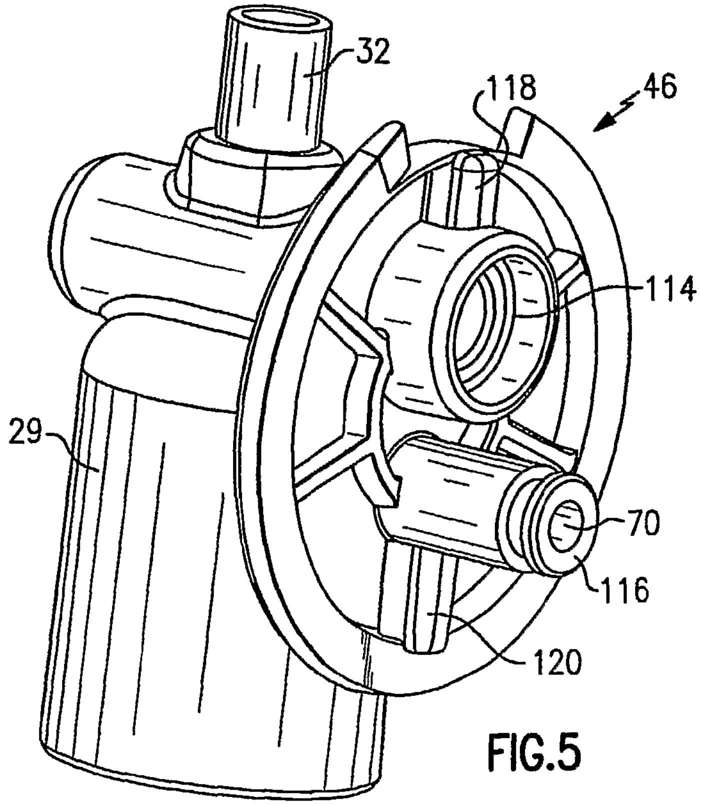
FIG. 5 schematically illustrates a perspective view of the pump head.

FIG. 5 illustrates the pump head 46. The pump head 46 includes a circumferential flange 94 that extends around the circumference of the pump head 46. The pump head 46 also includes a piston opening 114 that receives a portion of the piston 48 and the water port 116 that detects a portion of the water flow path 70.

In one example, the pump head 46 includes a protrusion 118 that extends from the piston opening 114 and towards the circumferential flange 94 and another protrusion 120 that extends from the water port 116 and towards the circumferential flange 94. In one example, the protrusions 118 and 120 have a substantially rectangular cross-section The protrusions 118 and 120 are aligned in a straight line.

A piston seal 60 provides a seal between the piston 48 and the pump head 46 and provides a wiping action as the piston 48 moves in the pump head 46. The piston seal 60 is made from an elastomeric material and overmolded onto a steel backing ring. A backing seal 66 provides a barrier between a wetted portion of the pump head 46 and the water port 40 of the housing 62 to prevent accidental spillage or splashing of the flavored concentrate 24 or a cleaning solution from entering the hub assembly 56.

Figure 6:
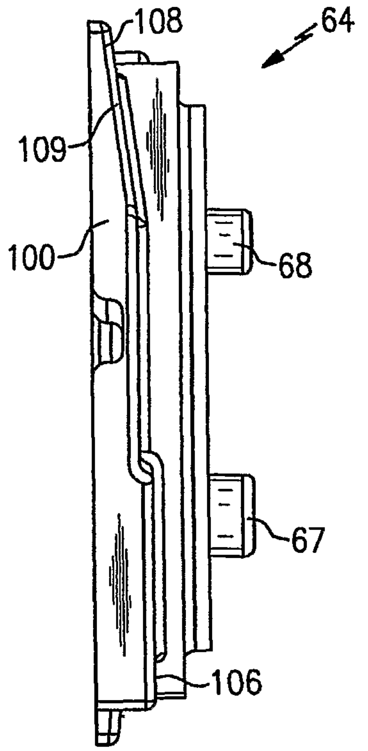
FIG. 6 schematically illustrates a side view of the adapter plate of the pump.
Figure 7:
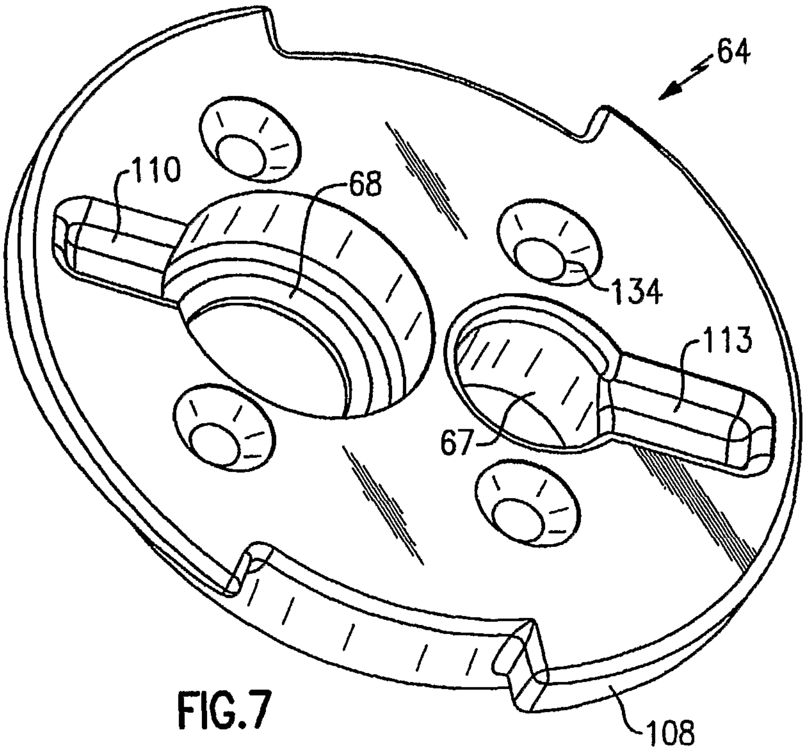
FIG. 7 schematically illustrates a perspective view of an adapter plate.

As shown in FIGS. 6 and 7, the pump 26 further includes an adapter plate 64 that maintains a geometric relationship between the piston 48 and the piston opening 124 of the housing 62 and minimizes movement of the piston 48. The adapter plate 64 includes a piston opening 67 that receives a portion of the piston 48 and a water opening 68 that receives the water port 116 of the pump head 46. The adapter plate 64 includes a circumferential flange 100. The circumferential flange 100 includes two opposing ramped portions each having a lower part 108, an inclined part 109 and a raised upper part 106. The adapter plate 64 also includes a corresponding another of a protrusion or recess 134 that surrounds the piston opening 67. When the adapter plate 64 is assembled in the pump 26, the protrusions or recesses 132 align with the another of the protrusion or a recess 134 to align the adapter plate 64 and the housing 62. The piston opening 67 of the adapter plate 64 has a diameter, and the piston opening 114 of the pump head 46 has a diameter. The diameter are substantially equal.

In one example, the adapter plate 64 includes a depression 110 that extends from the piston opening 67 and towards the circumferential flange 100 and another depression 113 that extends from the water opening 68 and towards the circumferential flange 100. In one example, the depressions 110 and 113 have a substantially rectangular cross-section. The depressions 110 and 113 are aligned in a straight line.

When the adapter plate 64 is installed in the pump 26, the piston opening 67 of the adapter plate 64 and the piston opening 114 of the pump head 46 align, and the water port 116 of the pump head 46 is received in the water opening 68 of the adapter plate 64. The protrusion 118 of the pump head 46 is received in the depression 110 of the adapter plate 64, and the protrusion 120 of the pump head 46 is received in the depression 113 of the adapter plate 64. The depressions 110 and 113 and the protrusions 118 and 120 provide a positive locking and locating feature that ensure proper alignment, engagement and installation of the adapter plate 64 relative to the pump head 46 to ensure proper operation and accuracy of the pump 26. The depressions 110 and 113 and the protrusions 118 and 120 can also be integrated into the pump head 46 and the adapter plate 64. Although the pump head 46 is illustrated and described as including the protrusions and the adapter plate 64 is illustrated and described as including the depressions, it is to be understood that the pump head 46 can include depressions and the adapter plate 64 can include the protrusions.

Figure 8:
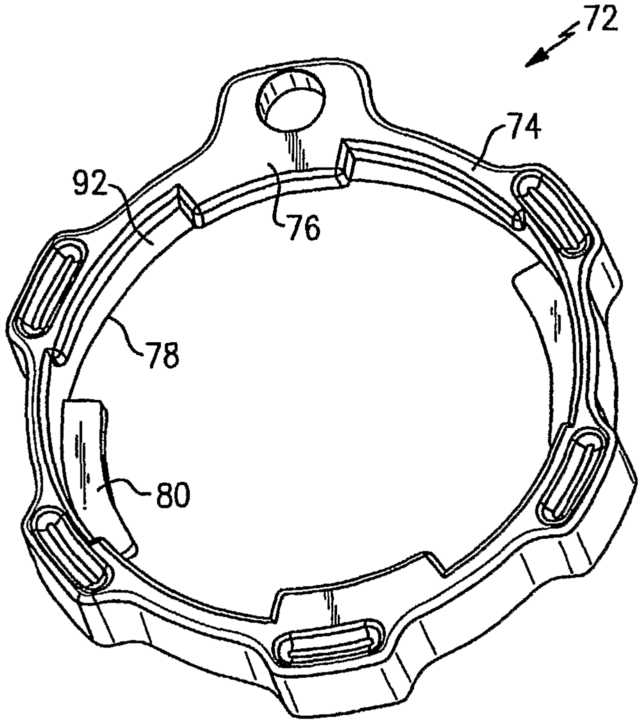
FIG. 8 schematically illustrates a perspective view of a locking ring of the pump.

As shown in FIG. 8, a locking ring 72 attaches the adapter plate 64 to the pump head 46, creating a geometric lock between the pump head 46 and the adapter plate 64. The locking ring 72 secures the pump head 46 to the adapter plate 64 to prevent leakage of the flavored concentrate 24 and the water from the pump head 46 and prevent inaccuracy. The locking ring 72 is substantially circular in shape and is made of plastic. The locking ring 72 includes a first side 74 with a plurality of first inward tabs 76 and an opposing second side 78 with a plurality of second inward tabs 80. In one example, the first side 74 includes two first inward tabs 76, and the second side 78 includes two second inward tabs 80. A gap 92 is defined between the inward tabs 76 and 80. Outward fingers 82 extend from the locking ring 72 to provide a surface for the operator to grab when rotating the locking ring 72.

The locking ring 72 and the pump head 46 are provided as a subassembly. The locking ring 72 is forced onto the pump head 46 such that the circumferential flange 94 of the pump head 46 is received in the gap 92 of the locking ring 72. The locking ring 72 freely rotates relative to the pump head 46.

Figure 9:
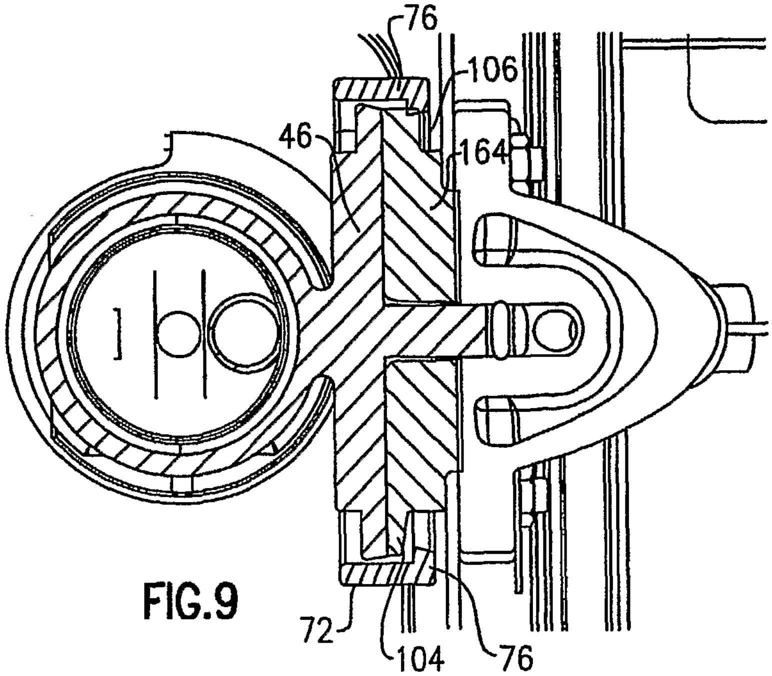
FIG. 9 schematically illustrates a top view of the pump.

When the components are installed, the circumferential flange 100 of the adapter plate 64 is positioned to be received in the gap 92 of the locking ring 72. That is, both the circumferential flange 100 of the adapter plate 64 and the circumferential flange 94 of the pump head 46 are received in the gap 92. The first inward tabs 76 of the locking ring 72 engage the adapter plate 64, and the second inward tabs 80 of the locking ring 72 engage the pump head 46. The locking ring 72 is rotated relative to the pump head 46 in a first direction until each of the first inward tabs 76 engage one of the raised upper parts 106 of the adapter plate 64 to wedge the locking ring 72 in the locked position and to attach the adapter plate 64 to the pump head 46, as shown in FIG. 9. The engagement of the locking ring 72 and the raised upper part 106 of the adapter plate 64 prevents the locking ring 72 from further rotation, and the locking ring 72 is then stopped in a locked position.

Although a beverage system 20 is illustrated and described, it is to be understood that the pump 26 of the present invention can be used in other systems. For example, the pump 26 can be used in a soft drink system. In this example, the pump 26 pumps flavored syrup which is mixed with carbonated water to make a soft drink. Alternately, the pump 26 pumps flavored syrup which is mixed with a frozen substance to create a frozen dessert.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A pump comprising:

a piston moveable by a motor;

a pump head including a pump head piston opening that receives the piston, a water port through which water flows, a concentrate port through which concentrate flows, and one of a protrusion and a depression, wherein the pump head piston opening has a first diameter; and an adapter plate including an adapter plate piston opening through which the piston is received, a water opening that receives the water port, and the other of the protrusion and the depression, wherein the adapter plate piston opening has a second diameter, and the first diameter is substantially equal to the second diameter, wherein the protrusion is received in the depression to substantially align the pump head piston opening of the pump head with the adapter plate piston opening of the adapter plate.

2. The pump as recited in claim 1 wherein the pump head includes the protrusion and the adapter plate includes the depression.

3. The pump as recited in claim 1 wherein the protrusion and the depression have a substantially rectangular cross-section.

4. The pump as recited in claim 1 wherein the pump head includes two protrusions and the adapter plate includes two depressions.

5. The pump as recited in claim 4 wherein the two protrusions include a first protrusion that extends from the water port and a second protrusion that extends from the pump head piston opening and the two depressions include a first depression that extends from the water opening and a second depression that extends from the adapter plate piston opening.

6. The pump as recited in claim 1 further including a locking ring that secures the adapter plate to the pump head.

7. The pump as recited in claim 1 including a mixing chamber and a motor to move the piston, wherein the piston moves to draw the concentrate into the concentrate port of the pump head and into the mixing chamber to combine with water to form a beverage.

8. The pump as recited in claim 1 wherein the pump head includes a circumferential flange and the locking ring includes a first side having a first tab, an opposing second side having a second tab, and a gap therebetween, and the circumferential flange of the pump head is received in the gap.

9. The pump as recited in claim 8 wherein the adapter plate includes a circumferential flange received in the gap of the locking ring.

10. The pump as recited in claim 9 wherein the circumferential flange of the adapter plate includes a ramped portion having a lower part, an inclined part and a raised upper part, and the first tab on the first side of the locking ring engages the raised upper part of the adapter plate when the locking ring is in the locked position to secure the locking ring in the locked position.

11. The pump as recited in claim 1 wherein the adapter plate aligns the piston with the pump head.

12. The pump as recited in claim 1 wherein the piston is substantially horizontal during use.

13. The pump as recited in claim 1 wherein the adapter plate includes a face that is substantially perpendicular to an axis of the piston, and the other of the protrusion and the depression is located on the face of the adapter plate.

14. The pump as recited in claim 1 wherein the first diameter of the pump head opening is approximately equal to a diameter of the piston.

15. A pump comprising:

a piston moveable by a motor;

a pump head including a pump head piston opening that receives the piston, a concentrate port through which concentrate flows, a water port through which water flows, and one of a protrusion and a depression, wherein the pump head piston opening has a first diameter;

an adapter plate including adapter plate piston opening through which the piston is received, a water opening that receives the water port, wherein the adapter plate piston opening has a second diameter, and the first diameter is substantially equal to the second diameter; and a locking ring that secures the adapter plate to the pump head, wherein the protrusion is received in the depression to substantially align the pump head piston opening of the pump head with the adapter plate piston opening of the adapter plate, and the protrusion and the depression have a substantially rectangular cross-section.

16. The pump as recited in claim 15 wherein the pump head includes the protrusion and the adapter plate includes the depression.

17. The pump as recited in claim 15 wherein the pump head includes two protrusions and the adapter plate includes two depressions.

18. The pump as recited in claim 17 wherein the two protrusions include a first protrusion that extends from the water port and a second protrusion that extends from the pump head piston opening and the two depressions include a first depression that extends from the water opening and a second depression that extends from the adapter plate piston opening.

19. The pump as recited in claim 15 including a mixing chamber and a motor to move the piston, wherein the piston moves to draw the concentrate into the concentrate port of the pump head and into the mixing chamber to combine with water to form a beverage.

20. The pump as recited in claim 15 wherein the pump head includes a circumferential flange and the locking ring includes a first side having a first tab, an opposing second side having a second tab, and a gap therebetween, and the circumferential flange of the pump head is received in the gap.

21. The pump as recited in claim 20 wherein the adapter plate includes a circumferential flange received in the gap of the locking ring.

22. The pump as recited in claim 21 wherein the circumferential flange of the adapter plate includes a ramped portion having a lower part, an inclined part and a raised upper part, and the first tab on the first side of the locking ring engages the raised upper part of the adapter plate when the locking ring is in the locked position to secure the locking ring in the locked position.

23. The pump as recited in claim 15 wherein the piston is substantially horizontal during use.

24. The pump as recited in claim 15 wherein the adapter plate includes a face that is substantially perpendicular to an axis of the piston, and the other of the protrusion and the depression is located on the face of the adapter plate.

* * * * *